United States Patent Office 3,514,433
Patented May 26, 1970

3,514,433
PROCESS FOR THE PRODUCTION OF ISOTACTIC POLYOLEFINS
Adrien Nicco, Verneuil-en-Halatte, France, assignor to Societe Normande de Matieres Plastiques, Paris, France, a French society
No Drawing. Filed Feb. 3, 1965, Ser. No. 430,215
Claims priority, application France, Feb. 4, 1964, 962,533
Int. Cl. C08f 1/56
U.S. Cl. 260—88.2          10 Claims

ABSTRACT OF THE DISCLOSURE

Alpha-olefins are polymerized into isotactic polyolefins using catalysts formed from titanium chlorides and alkyl aluminum compounds, the catalyst system including a hydrazine compound of the formula:

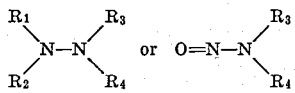

in which $R_1$, $R_2$, $R_3$ and $R_4$, which may be the same or different, are hydrogen, alkyl, hydroxyl, alkoxyl, aryl, cycloalkyl, aryloxy, alkylidene, carbonyl, such as formyl, thiocarbonyl or dialkylaluminium or one of them is a divalent radical, the free valency of which is joined to another hydrazine moiety of the above formula or two of them form a cyclic structure together with the nitrogen atom(s) to which they are attached. The inclusion of the indicated hydrazine compound increases the proportion of highly crystalline polyolefin which is secured under increased polymerization rates.

---

This invention is concerned with a process for the production of isotactic polyolefins.

Alpha-olefins can be polymerized to stereoregular crystalline polymers using various catalytic systems; the most effective of these systems comprise, firstly, a subdivided solid constituent containing TiCl₃ and, secondly, a second constituent of the alkyl-metal type, such as triethylaluminium, diethylmonochloroaluminium, diethylmonobromoaluminium and ethyldichloroaluminium. The polymerization medium is usually a liquid hydrocarbon.

It is also known that improved results can be obtained by including, in the catalyst composition, substances which have the effect of modifying either the polymerization rate or the degree of polymerization of the polymer obtained or the crystallinity of the polymer. The molecular weight distribution of the final product and the proportion of crystalline macromolecules and, in certain cases, the factors influencing copolymerization can also be modified by the use of catalyst additives.

The improvement of stereospecificity is, in particular, of considerable technical and economic interest. In effect, the more crystalline the polymer, the better are its properties, particularly its rigidity and heat resistance.

For use as films or textile filaments, the polymers desirably have a high crystallinity so that, for these uses, the fraction of the polymer product which has low crystallinity is of very reduced value and is practically unusable. Any increase in stereospecificity, even an increase which in other circumstances would seem relatively small, therefore has the result of improving the quality of the final product obtained, of increasing the yield of highly crystalline polymers and of reducing the losses due to the formation of amorphous polymer.

We have now developed a new catalyst composition which has the property of giving rise to very highly crystalline poly-alpha-olefins. Other properties of this composition are that it gives rise to increased polymerisation rates and to improvements in the various properties mentioned above.

The catalyst composition according to the invention is characterised in that it contains, in addition to the constituents of a conventional Ziegler-type catalyst as described above, a hydrazine compound of the formula:

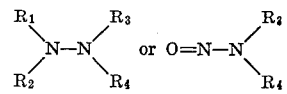

in which $R_1$, $R_2$, $R_3$ and $R_4$, which may be the same or different, are hydrogen, alkyl, hydroxyl, alkoxy, aryl, cycloalkyl, aryloxy, alkylidene, carbonyl, such as formyl, thiocarbonyl or dialkylaluminium or one of them is a divalent radical, the free valency of which is joined to another hydrazine moiety of the above formula or two of them form a cyclic structure together with the nitrogen atom(s) to which they are attached.

Ziegler-type catalysts are conveniently obtained by reacting an organo-metallic compound with a transition metal halide in the presence of a hydrocarbon solvent, such as iso-octane, n-heptane, benzene or the liquid monomer itself. The molar ratio between the organo-metallic compound and the metal halide can be varied within wide limits. A ratio of from about 0.25 to about 4 moles of the metal halide, such as titanium or vanadium trichloride, per mole of an alkylaluminium compound is suitable. In addition, the concentration of alkylaluminium is usually between 1 and 30 millimoles/litre, preferably from 4 to 20 millimoles/litre. By way of example, a typical catalyst system comprises the combination of triisobutylaluminium and titanium trichloride in equimolar proportions and in concentrations of 10 millimoles/litre.

The polymerization of an alpha-olefin with a Ziegler-type catalyst is ordinarily carried out by contacting the olefin with the catalyst in the presence of an inert solvent, such as benzene or a saturated hydrocarbon, such as iso-octane, n-hexane, pentane or cyclohexane. The reaction is generally effected at a temperature of from 0 to 200° C., preferably from 30 to 100° C., under pressures in the region of atmosphere pressure and preferably slightly greater than the latter. Polymerization can also be effected in the liquid monomer at its saturation pressure.

Ziegler-type catalysts are used not only for the polymerization of ethylene, but also for the production of high polymers of higher alpha-olefins, in particular, propylene and also alpha-butene, alpha-pentene, alpha-hexene, 4-methyl-1-pentene, 3-methyl-1-butene, vinylcyclohexane and styrene.

Statistical copolymers or block copolymers of two or more alpha-olefinic monomers, such as propylene and ethylene, can also be obtained with these catalysts.

In the catalyst compositions according to the invention, it is particularly preferred to use titanium trichloride as the transition metal halide.

Titanium trichloride can be prepared by various methods and it may contain other compounds, such as TiCl₂ and AlCl₃, or be distributed on a support; it can also be used in a more or less finely subdivided form and be used in various crystalline forms, its crystallinity being more or less perfect according to its manner of preparation and the chemical, mechanical or thermal treatments to which it has been subjected with a view to improving its stereospecificity and its activity.

By the use of these known catalysts, various stereospecificities can be obtained depending on the catalyst system employed, the pressure, the temperature and the medium. The stereospecificity is determined, for example, by means of an extraction test as described below. The additives, used in suitable quantities, in general lead to an improvement in the stereospecificity obtained with any given Ziegler-type catalyst system. They also modify the degree and rate of polymerization and other characteristics as has been explained.

It has already been proposed to use certain nitrogen-containing additives; such compounds, added in a wide range of quantities according to the nature of the nitrogen-containing compound and the composition of the catalyst, in general lead to an increase in the proportion of highly crystalline poly-alpha-olefins and the isotactic steric regularity of the polymers obtained. Among the substances already proposed there may be mentioned amines, amides, polyamines, polyamides and aminosilanes. In general the additives are used with Ziegler catalysts containing $TiCl_3$ and trialkyl- or dichloroalkylaluminium.

On the other hand, the hydrazine derivatives used as additives according to the present invention give particularly interesting results wtih catalysts comprising dialkylchlorides of aluminium.

Thus, these catalysts, used without additive under a pressure of 1 to 2 atmospheres in the polymerization of propylene at 40 to 70° C. give stereospecificities of 90 to 94%, which correspond to 10 to 6% of practically amorphous polymer.

The additives according to the invention enable the proportion of amorphous polymer obtained to be reduced to 3 to 5%, which corresponds to stereospecificities of 95 to 97%.

Even higher stereospecificities can be obtained if a bromodialkylaluminium is used as the organometallic compound of the Ziegler catalyst.

These results are better than those which it is actually possible to obtain with an identical catalyst system including other additives, such as hexamethylphosphoramide, pyridine, tetramethylmethylenediamine or dimethylformamide.

The quantity of additive used should be such that the molar ratio of additive/alkylmetal is from 0.01 to 0.3 or such that its concentration in the liquid medium is from 0.05 to 1.5 millimoles/litre, preferably from 0.1 to 1 millimole/litre. The use of smaller quantities does not lead to any appreciable change in the properties of the catalyst used without additive, while the use of larger quantities leads to a great reduction in the polymerization rate.

Among the compounds which can be employed as additives according to the invention are, for example, hydrazine, methyl-hydrazine, 1,1-dimethyl-hydrazine, 1,2-dimethyl-hydrazine, trimethyl-hydrazine, tetramethyl-hydrazine, phenyl-hydrazine, formylhydrazine, 1-formyl-1-diethylaluminium-hydrazine, benzoyl-hydrazine, 1,1-dimethyl-2-diethyluminium-hydrazine, 3,5 - dimethyl-pyrazole, nitrosodimethylamine, hexamethylmethylenedihydrazine, and hexamethylcarbazide, as well as the analogous compounds and derivatives formed, for example, from phthalic acid and benzoylhydrazine. From the point of view of activity and yield of polymer with respect to $TiCl_3$, the most advantageous additives are, in order of decreasing merit, 1,1-dimethyl-2-formylhydrazine, diethylaluminium-hydrazine, 1-diethylaluminium-2,2-dimethylhydrazine and 3,5-dimethyl-pyrazole.

From the point of view of stereospecificity, the most advantageous additives are, in order of decreasing merit, diphenylthiocarbazone, 1,1-dimethylhydrazine, phenylhydrazine, 1-diethylaluminium-2,2-dimethyl-hydrazine, dimethylnitrosoamine and 3,5-dimethyl-pyrazole.

On the other hand, from the practical point of view, diethylaluminum-hydrazine, 1,1-dimethylhydrazine, 3,5-dimethyl-pyrazole and 1-diethylaluminium-2,2-dimethylhydrazine are the preferred additives.

Various conditions of temperature, pressure and solvent can be used; they can be any of those conditions which are used with Ziegler catalysts without additive, that is to say a temperature from 0 to 200° C., preferably from 20 to 100° C., and a pressure from 1 to 20 atmospheres, preferably from 1 to 10 atmospheres.

Preferred operating conditions are indicated in the examples, but the hydrazine additives can be used under very diverse conditions with respect to the constituents of the catalyst, the solvent, the temperature and the pressure, and to polymerize various alpha-olefins. Their effect is always to increase the stereospecificity of the polymerization, to lead to more crystalline polymers and, accessorily, to increase or reduce the polymerization rate and the viscosity of the polymer as a function of the desired result.

As compared with the use of known additives, the use of the hydrazine additives according to the invention leads, in most cases, to improved yields with an equal stereospecificity effect or to an improved stereospecificity with an equal yield. In all cases, the use of the hydrazine additives does not present any disadvantage as regards the stability or the use of the final products because they do not leave any toxic or corrosive residue in the polymers after the latter have been subjected to known purification treatments.

The following examples are given by way of illustration only.

In these examples, the indication of the percentage of polymer which is insoluble on extraction with boiling heptane is, in effect, a measure of crystallinity and therefore of the stereospecificity of the polymerization. These values (parts insoluble in boiling heptane) are not absolute characteristics since they are affected by a number of variable factors, namely the sample of $TiCl_3$ used, its preparation and activation, the concentrations, the solvents, the temperature and the pressure. In order to show clearly the effect of the additives, the values obtained with and without additive, but using the same $TiCl_3$, are given, this determination being reproducible to 0.5%.

The intrinsic viscosities or viscosimetric limit number of the polymers given in the examples are expressed in dl./g.

Examples 1 to 4 are given by way of comparison in order to show the results obtained with catalysts to which have been added known additives.

Example 1

Into a 2-litre glass vessel provided with a reflux cooling apparatus and a powerful agitator, there were introduced under an atmosphere of nitrogen and in the following order:

1 l. of anhydrous technical heptane, hexamethylphosphorotriamide as additive,
6 millimoles of chlorodiethylaluminium as activator,
4 millimoles of violet titanium trichloride, prepared by reduction of titanium tetrachloride with aluminium and grinding of the powder obtained.

When the temperature of the medium was stabilized at 60° C., the inert gas was purged with a stream of propene. Polymerization was effected for 5 hours at 60° C. under a total pressure of 1 atmosphere.

As a function of the quantity of additive, the following results were obtained:

| mM. additive | Activity, g. polymer/ g. $TiCl_3$/hr. | Percent insoluble in boiling n-heptane |
|---|---|---|
| 0 | 26 | 90.5 |
| 0.1 | 23 | 92.5 |
| 0.2 | 22 | 93.5 |
| 0.3 | 21 | 94 |
| 0.4 | 22 | 94 |
| 0.5 | 23 | 94 |
| 0.6 | 24 | 94 |
| 0.8 | 25 | 93 |

Example 2

Under the same conditions as in Example 1, but using pyridine as the additive, the following results were obtained:

| mM. additive | Activity, g. polymer/ g. cata./hr. | Percent insoluble in boiling n-heptane |
| --- | --- | --- |
| 0 | 22 | 89.5 |
| 0.1 | 22 | 91.5 |
| 0.2 | 22 | 91.5 |
| 0.3 | 23 | 91.5 |
| 0.5 | 24 | 91 |

Example 3

Under the same conditions as in Example 1, but using tetramethylmethylenediamine as the additive, the following results were obtained:

| mM. additive | Activity, g. polymer/ g. cata./hr. | Percent insoluble in boiling n-heptane |
| --- | --- | --- |
| 0 | 26 | 90.5 |
| 0.1 | 26 | 92 |
| 0.2 | 25 | 93 |
| 0.3 | 24 | 93 |
| 0.5 | 22 | 93 |
| 0.8 | 18 | 92 |
| 1 | 14 | 91.5 |

Example 4

Under the same conditions as in Example 1, but using dimethylformamide as the additive, the following results were obtained:

| mM. additive | Activity, g. polymer/ g. cata./hr. | Percent insoluble in boiling n-heptane |
| --- | --- | --- |
| 0 | 22 | 93 |
| 0.1 | 22 | 93.5 |
| 0.2 | 22 | 94 |
| 0.3 | 22 | 93.5 |
| 0.6 | 19 | 89 |

Example 5

Using the same conditions as in Example 1 and 0.25 mM./litre of hydrazine as additive, 62 g. of polymer, of which 94.5% was insoluble in boiling n-heptane, were obtained.

The purification of the polymer was carried out as follows:

After completion of the 5 hour polymerization period, the supply of propene was stopped and replaced by an inert gas. 20 cc. of butanol were then added to the reaction mixture and the latter heated to 70° C. for 30 minutes. The polymer suspension, still under an inert atmosphere, was washed with 300 cc. of pure water; this operation was repeated four times. The polymer was then washed with boiling water containing 0.1% of sodium ethylenediaminetetraacetate. The polymer was filtered and dried. The dry polymer contained less than 0.01% of ash.

When polymerization was carried out as described above with chlorodietyhlaluminium as activator, but without the hydrazine, 79 g. of polymer, of which only 90.5% was insoluble in boiling n-heptane, were obtained.

Using the same conditions with 0.30 mM. of hydrazine as additive and 6 mM. of bromodiethylaluminium as activator, a highly crystalline polymer was obtained.

Example 6

Under the same conditions as in Example 5, but using 0.7 mM. of 1,1-dimethyl-hydrazine in place of 0.25 mM. of hydrazine, 59 g. of polymer, of which 96% was insoluble in boiling n-heptane, were obtained.

Example 7

Under the same conditions as in Example 5, but with 0.5 mM. of phenyl-hydrazine as additive, 62 g. of polymer, of which 95.5% was insoluble in boiling n-heptane, were obtained.

Example 8

Under the same conditions as in Example 5, but with 0.5 mM. of 1,1-dimethyl-2-formyl-hydrazine as additive, 77 g. of polymer, of which 95% was insoluble in boiling n-heptane, were obtained.

Example 9

Using the operating conditions of Example 5, the following results were obtained with various quantities of diethylaluminiumhydrazine as additive.

| mM. additive | Activity, g. polymer/g. TiCl$_3$/hr. | Percent insoluble in boiling n-heptane | Intrinsic viscosity |
| --- | --- | --- | --- |
| 0 | 26 | 90.5 | 6.5 |
| 0.1 | 28 | 93.5 | |
| 0.2 | 29.5 | 94 | |
| 0.3 | 30 | 95 | |
| 0.4 | 29 | 95 | 7.2 |
| 0.5 | 30 | 94.5 | |
| 0.6 | 29 | 94 | |

Example 10

Under the same conditions as in Example 5, but using 0.2 mM. of 1-diethylaluminium-2,2-dimethylhydrazine, 70 g. of polymer, of which 95.5% was insoluble in boiling n-heptane and which had an intrinsic viscosity of 6.8, were obtained.

Example 11

Under the same conditions as in Example 5, using 0.2 mM. of diphenylthiocarbazone as additive, 62 g. of polymer, of which 96% was insoluble in boiling n-heptane, were obtained.

Example 12

Under the same conditions as in Example 5, but using 0.25 mM. of N-phenyl-N-nitroso-hydroxylamine, 52 g. of polymer, of which 94% was insoluble in boiling n-heptane, were obtained.

When this additive was replaced by an ammonium salt, the same result was obtained.

Example 13

Under the same conditions as in Example 5, but using 0.3 mM. of phthalyldihydrazine, 59 g. of polymer, of which 95% was insoluble in boiling n-heptane, were obtained.

Example 14

Under the same conditions as in Example 5, but using 0.4 mM. of trimethylformyl-hydrazine, 59 g. of polymer, of which 95% was insoluble in boiling n-heptane, were obtained.

Example 15

Under the same conditions as in Example 5, but using 0.25 mM. of dimethylnitrosoamine, 56 g. of polymer, of which 95.5% was insoluble in boiling n-heptane, were obtained.

Example 16

Under the same conditions as in Example 5, but using 0.5 mM. of dimethylisopropylidene-hydrazine, 43 g. of polymer, of which 95% was insoluble in boiling n-heptane, were obtained.

Example 17

Under the same conditions as in Example 5, but using 0.5 mM. of 3,5-dimethyl-pyrazole, 74 g. of polymer, of which 95.5% was insoluble in boiling n-heptane, were obtained.

Example 18

1-butene was polymerized in cyclohexane under the same conditions as in Example 1, using diethylaluminiumhydrazide as additive. The crystallinity of the product was determined by the percentage of it which was insoluble in boiling diethyl ether. The following results were obtained:

| mM. additive | Acitivity, g. polymer/g. TiCl₃/hr. | Percent insoluble in boiling ether |
|---|---|---|
| 0 | 21 | 81.5 |
| 0.05 | 21 | 90 |
| 0.25 | 22 | 87 |
| 0.5 | 22 | 82.5 |

When polymerization was effected in octane or in a mixture of decanes, substantially the same results were obtained.

When polymerization was effected under these conditions using tetramethylmethylenediamine as the additive, only 85% at the most of the product was insoluble in boiling ether.

Example 19

Using a process similar to that described in Example 5, there were introduced into the reaction vessel in the following order:

1 litre of anhydrous industrial heptane,
0.5 mM. of 1-diethylaluminium-2,2-dimethyl hydrazine,
6 mM. of chlorodiethylaluminium, and
a suspension of 4 mM. of titanium trichloride to which had been added 0.05 mM. of dichloroethylaluminium.

The titanium chloride was prepared by reduction at 0° C. of titanium tetrachloride with an excess of aluminium sesquichloride in solution in a heavy aliphatic solvent. The product obtained was heated to 85° C. and washed in order to eliminate the chloro and alkyl derivatives of aluminum.

Polymerization was then effected under the same conditions as in Example 5. There were obtained 77 g. of polymer, of which 92% was insoluble in boiling n-heptane.

When polymerization was effected under the same conditions, but omitting the hydrazine compound and the dichloroethylaluminium, 92 g. of polymer were obtained, of which only 87.5% was insoluble in boiling n-heptane.

Example 20

Into a 2-litre glass vessel provided with a reflux cooling device and a powerful agitator, there were introduced under an inert gas, such as nitrogen, and in the following order:

1 litre of anhydrous technical heptane,
0.5 mM. of diethylaluminium hydrazine as additive,
20 mM. of chlorodiethylaluminium, and
20 mM. of violet titanium trichloride prepared by reduction of titanium tetrachloride with hydrogen and grinding of the product obtained.

After waiting until the temperature of the medium was stabilized at 60° C., 100 cc. of 4-methyl-1-pentene were added in a single addition. There were obtained 51 g. of highly crystalline polymer.

Example 21

Into a 2-litre autoclave provided with a powerful agitator, there were introduced in the following order:

1 litre of anhydrous technical heptane,
0.6 mM. of 3,5-dimethyl-pyrazole as additive,
4 mM. of chlorodiisobutylaluminium, and
1 mM. of titanium trichloroide prepared as in Example 5.

Propylene was polymerized at various temperatures and pressures, the following results being obtained:

| Temperature, ° C. | Total pressure, atm. | Stereospecificity, percent |
|---|---|---|
| 40 | 3 | >98 |
| 50 | 3 | 98.2 |
| 60 | 5 | 97.4 |
| 70 | 10 | 96.8 |

Example 22

Into a 2-litre glass vessel provided with a reflux cooling device and a powerful agitator, there were introduced under nitrogen and in the following order:

1 litre of anhydrous technical heptane,
0.4 mM. of 1,1-dimethyl-2-formyl-hydrazine as additive,
6 mM. of chlorodiethylaluminium, and
4 mM. of violet titanium trichloride prepared by reduction of titanium tetrachloride with aluminium and grinding of the powder obtained.

Propene containing 2 mole percent of ethylene was then polymerized at 50° C. and under a total pressure of 1 atmosphere; less than 7% of the polymer obtained was soluble in the polymerization medium, while, in control experiments without additive, from 10 to 15% of the polymer was found to be soluble.

Example 23

Pure propene was polymerized under the same conditions as in Example 22, and every hour 2 mole percent of ethylene, with respect to the propene polymerized in the hour, was injected. A polymer, of which the proportion soluble in the medium was less than 5%, was obtained.

What I claim is:

1. A process for the production of isotactic polyolefins by low pressure polymerization of alpha-olefins, using a catalytic system composed of:
   (a) a solid component composed essentially of a violet form of titanium trichloride in activated state;
   (b) an aluminum alkyl halide of the formula $$AlX_nR_{(3-n)}$$

wherein X is Cl or Br, R is ethyl, propyl, or isobutyl and $n$ is 1 or 2, and consisting principally of a compound of the formula $AlXR_2$, and
   (c) a member selected from the group consisting of

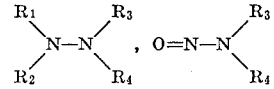

methyl - formyl - hydrazine, 3,5 - dimethylpyrazole, hexamethylcarbazide and diphenylthiocarbazone, in which $R_1$, $R_2$, $R_3$ and $R_4$, which may be the same or different are hydrogen, alkyl, hydroxyl, alkoxy, aryl, cycloalkyl, aryloxy, or dialkyaluminum.

2. The process of claim 1 in which the proportion of said compound (c) added is such that the molar ratio of said compound (c) to the alkylmetal derivative (b) of the catalyst system is from 0.01 to 0.3 and such that the concentration of said compound in the liquid polymerization medium is from 0.05 to 1.5 millimoles/liter.

3. The process of claim 1 in which the proportion of said compound (c) added is such that its concentration in the liquid polymerization medium is from 0.1 to 1 millimole/liter.

4. The process of claim 1 in which the titanium trichloride is associated with aluminum chloride and titanium dichloride, in the component (a) of the catalyst system.

5. The process of claim 1 in which the polymerization medium contains from 4 to 20 millimoles/liter of the alkyaluminum compounds and from 1 to 20 millimoles/liter of titanium trichloride.

6. The process of claim 1 in which polymerization is effected at a pressure of from 1 to 30 atmospheres and at a temperature of from 20 to 100° C.

7. The process of claim 1 in which polymerization is effected at a pressure of from 1 to 10 atmospheres and at a temperature of from 40 to 80° C.

8. The process of claim 1 in which said compound (c) is selected from the group consisting of diethylaluminumhydrazine, 1 - diethylaluminum - 2-2 - dimethylhydrazine, 1,1-dimethylhydrazine, phenylhydrazine and dimethylnitrosoamine.

9. The process of claim 1 in which the compound having the formula $AlXR_2$ is $AlCl(C_2H_5)_2$.

10. The process of claim 1 in which the alpha olefins employed are selected from the group consisting of propylene, alpha-butene, methyl-4-pentene-1, and mixture of ethylene and propylene.

References Cited

UNITED STATES PATENTS

| 3,281,401 | 10/1966 | Harban et al. | 260—93.7 |
| 3,325,461 | 6/1967 | Boor | 260—93.7 |
| 3,159,598 | 12/1964 | Bruce et al. | 260—94.3 |
| 3,086,000 | 4/1963 | Wargotz | 260—94.3 |

FOREIGN PATENTS

| 1,180,944 | 11/1964 | Germany. |
| 37/14,633 | 9/1962 | Japan. |
| 1,318,882 | 1/1963 | France. |

JOSEPH L. SCHOFER, Primary Examiner

E. J. SMITH, Assistant Examiner

U.S. Cl. X.R.

252—429; 260—93.1, 93.5, 93.7, 94.9, 878